United States Patent
Bonaque González et al.

(10) Patent No.: US 12,146,796 B2
(45) Date of Patent: Nov. 19, 2024

(54) WAVEFRONT CURVATURE SENSOR INVOLVING TEMPORAL SAMPLING OF THE IMAGE INTENSITY DISTRIBUTION

(71) Applicant: WOOPTIX S.L., Madrid (ES)

(72) Inventors: Sergio Bonaque González, Santa Cruz de Tenerife (ES); Juan Manuel Trujillo Sevilla, Santa Cruz de Tenerife (ES); José Manuel Rodríguez Ramos, San Cristóbal de La Laguna (ES)

(73) Assignee: WOOPTIX S.L., Madrid (ES)

( * ) Notice: Subject to any disclaimer, the term of this patent is extended or adjusted under 35 U.S.C. 154(b) by 661 days.

(21) Appl. No.: 17/309,196

(22) PCT Filed: Oct. 30, 2019

(86) PCT No.: PCT/EP2019/079713
§ 371 (c)(1),
(2) Date: May 5, 2021

(87) PCT Pub. No.: WO2020/094484
PCT Pub. Date: May 14, 2020

(65) Prior Publication Data
US 2022/0018718 A1    Jan. 20, 2022

(30) Foreign Application Priority Data

Nov. 5, 2018 (EP) .................................. 18380010

(51) Int. Cl.
*G01J 9/00* (2006.01)
*G01J 1/42* (2006.01)
(Continued)

(52) U.S. Cl.
CPC .............. *G01J 9/00* (2013.01); *G01J 1/4257* (2013.01); *G02B 26/0825* (2013.01); *G06T 5/50* (2013.01);
(Continued)

(58) Field of Classification Search
CPC ......... G01J 9/00; G01J 2009/002; G06T 5/50; G06T 2207/20216; H04B 10/11; H04B 10/548

See application file for complete search history.

(56) References Cited

U.S. PATENT DOCUMENTS

| | | | | |
|---|---|---|---|---|
| 5,412,200 A | * | 5/1995 | Rhoads | G01J 9/00 356/121 |
| 5,493,391 A | * | 2/1996 | Neal | G01J 9/00 356/121 |

(Continued)

FOREIGN PATENT DOCUMENTS

DE    102011077982 A1    12/2012

OTHER PUBLICATIONS

Extended European Search Report regarding European Patent Application No. 18380010.1, issued Jul. 4, 2019, 9 pages.

(Continued)

*Primary Examiner* — Tarifur R Chowdhury
*Assistant Examiner* — Roberto Fabian, Jr.

(57) ABSTRACT

The present invention relates to a system and method for reconstruction of temporal wavefront changes for use in an optical system comprising: measuring the distribution function of the light intensity, e.g. the two-dimensional distribution function of the light intensity, in at least two different images taken at different times, wherein said images are taken in at least one optical plane, e.g. the same optical plane, of the optical system.

15 Claims, 1 Drawing Sheet

(51) Int. Cl.
G02B 26/08 (2006.01)
G06T 5/50 (2006.01)
H04B 10/11 (2013.01)
H04B 10/548 (2013.01)

(52) U.S. Cl.
CPC ............... G01J 2009/002 (2013.01); G06T 2207/20216 (2013.01); H04B 10/11 (2013.01); H04B 10/548 (2013.01)

(56) References Cited

U.S. PATENT DOCUMENTS

| | | | | |
|---|---|---|---|---|
| 5,610,707 A | * | 3/1997 | Duncan | G02B 26/06 356/121 |
| 7,232,999 B1 | | 6/2007 | Otten, III et al. | |
| 8,324,546 B1 | * | 12/2012 | Embid | G02B 26/06 250/234 |
| 9,305,378 B1 | * | 4/2016 | Holmes | G02B 26/00 |
| 2002/0030824 A1 | * | 3/2002 | Wirth | G01J 9/00 356/512 |
| 2005/0045801 A1 | | 3/2005 | Smith | |
| 2008/0088851 A1 | | 4/2008 | Arieli et al. | |

OTHER PUBLICATIONS

International Search Report and Written Opinion regarding International Application No. PCT/EP2019/079713, issued Jan. 17, 2020, 11 pages.

Petruccelli et al., "The transport of intensity equation for optical path length recovery using partially coherent illumination", Optics Express, vol. 21, No. 12, Jun. 2013, pp. 14430-14441.

Bostan et al., "Phase retrieval by using transport-of-intensity equation and differential interference contrast microscopy", 2014 IEEE International Conference on Image Processing (ICIP), Oct. 2014, pp. 3939-3943.

* cited by examiner

WAVEFRONT CURVATURE SENSOR INVOLVING TEMPORAL SAMPLING OF THE IMAGE INTENSITY DISTRIBUTION

CROSS REFERENCE TO RELATED APPLICATIONS

This application is a 371 National Stage of International Application No. PCT/EP2019/079713, filed Oct. 30, 2019, which claims priority to European Patent Application No. EP 18380010.1, filed Nov. 5, 2018, the disclosures of which are herein incorporated by reference in their entirety.

BACKGROUND

State of the Art

When an electromagnetic wave passes through an inhomogeneous medium, its wavefront phase gets distorted or deformed with respect to its original shape or phase. Said wavefront distortions or aberrations can affect and degrade the performance of optical systems.

For example, in ground-based astronomical imaging with a telescope, light wavefronts from distant astronomical observing targets get distorted due to interactions with the turbulent Earth's atmosphere as well as due to interactions with optical elements, e.g. lenses or mirrors, of the telescope, thereby leading to degraded images.

However, also the performance of optical systems from other technical fields, such as, for example, photography, medical imaging, e.g. ophthalmology, microscopy, is adversely affected by wavefront distortions occurring along the optical path due to the interaction of the wavefronts with inhomogeneous media.

To measure and possibly correct said aberrations of an incoming wavefront passing through an optical system wavefront sensors are used. Currently known wavefront sensors can generally be divided into two classes: indirect wavefront sensors, that determine wavefront properties from whole-aperture light intensity measurements made at or near the focal plane of the optical systems, and direct wavefront sensors, that determine wavefront properties from sub-aperture light intensity measurements in the pupil plane, wherein the pupil can be split up into a plurality of sub-apertures by dedicated complex and complicated optical elements.

Both classes of wavefront sensors suffer from a variety of drawbacks. In particular, current indirect wavefront sensors and methods for estimating the original wavefront phase or shape are too slow for accurate real-time estimations of the current state and evolution of the (original) wavefront phase or wavefront shape.

For example, indirect wavefront sensors are based on phase retrieval algorithms involving a non-linear inverse problem, which is generally computationally complex and challenging and must be solved iteratively. Hence, such techniques are not well suited in fields that require accurate real-time phase estimation, like in astronomy or free-space optical communications (FSO), where both precision and speed of phase estimation is important.

Typical examples for direct wavefront sensors, wherein the wavefront shape or phase in the pupil plane of the optical system is determined using, for example, zonal or modal measurements, include Shack-Hartmann sensors, pyramidal sensors, shearing interferometry and curvature sensors.

The drawback of such wavefront sensors in particular lies in the fact is that they are technically complex and, for example, can comprise themselves a plurality of optical elements, e.g. a plurality of lenses.

In addition, current direct wavefront sensors are very sensitive to any alignment and calibration errors and also to sensitive to slight variations or degradations of optical components.

For example, for current known curvature sensors (CS) the accuracy of estimating real-time phase variations critically depends on the alignment accuracy of the optical system and on the precision with which the pupil plane of the optical system can be characterized and on the determining the exact location of the pupil plane. Known curvature sensors are therefore inter alia difficult to calibrate.

SUMMARY

Problem

It is therefore the object of the present invention to provide improved means for measuring wavefront distortions, i.e. wavefront phase distortions, in particular to provide improved means for the reconstruction of temporal wavefront changes or for reconstructing the wavefront evolution in an optical system.

In particular, for example, an aim of the present invention is to simplify and to speed up the measurement of temporal wavefront changes or temporal phase changes and further to provide means for increasing the robustness of wavefront sensor techniques.

Solution

An exemplary method for the reconstruction, e.g. two-dimensional reconstruction, of temporal wavefront changes, e.g. in optical light wavefronts, for use in an optical system may comprise one, some, or all of the following steps.
  a) measuring the distribution function of the light intensity, e.g. the two-dimensional distribution function of the light intensity, in at least two different images, e.g. in at least one pair of images, taken at different times, e.g. $t_0$ and $t_1$, wherein said images are taken in at least one optical plane, e.g. the same optical plane, of the optical system,
  b) identifying or labeling or classifying at least one image as intra-time image and at least one image as extra-time image, wherein said identifying or labeling or classifying, for example, is carried out on the basis that the intra-time image is/was taken at a time before the extra-time image is/was taken,
  c) applying a wavefront phase retrieval algorithm to the intra-time and extra-time image(s) for reconstructing temporal wavefront changes or phase changes that occurred between the times, e.g. $t_0$ and $t_1$, at which said images were taken.

Herein the term of taking an image can inter alia comprise not only the process of physically capturing an image, for example by means of an image detector, such as a charge-coupled device (CCD), but also can comprise the process of computing an image from a series or plurality of captured images and/or the process of retrieving a captured or computed image from a computer readable storage, wherein, for example, the image has not been physically taken but has been computationally calculated, for example, calculated from characteristics of the optical system, e.g. the image may be a computed characterizing image of a particular plane, e.g. the pupil plane, of a/the optical system.

In addition the time or time moment t0 may be referred to as initial time or initial moment and any time or time moment(s) after said initial time or initial moment, e.g. t1, t2 . . . tn, with n being a natural number, may be referred to as posterior moment(s).

In contrast to known systems and methods, the herein presented system(s) and method(s) allow the sampling and monitoring of the temporal evolution of wavefronts using the following transport of intensity equation relation that relates the wavefront or wavefront phase φ in the cross-sections of the incoming light beam to the rate of change in the beam intensity I. For example, assuming a thin phase-only object and uniform illumination, said transport of intensity equation can approximated to:

$$\frac{\varphi(x, y, z, t)}{\varphi t} \approx I(x, y, z, t+\delta t) - I(x, y, z, t)$$

wherein I (x, y, z, t+δt) and I (x, y, z, t) are the measured intensities at times t=t+δt and t, respectively and wherein x, y, z are coordinates in an orthogonal coordinate system for an optical system, wherein the Z-axis is aligned with the optical axis. Herein, for example, an image taken at time t=t+δt may be referred to as extra-time image, and an image taken at time t=t may be referred to as intra-time image.

The herein described method(s) and system(s) provide in particular inter alia the advantage that due to the use of just one single optical plane the system can be self-calibrated and an automatic compensation of systematic errors can be realized, as well as facilitating compensating variations in quantum efficiency.

Furthermore, the optical setting of the optical system can be simplified and the reconstruction of temporal wavefront changes can be carried out in a faster, simpler and more efficient manner as compared to known methods and systems.

The presented method and system(s) are inter alia capable of finding temporally spaced phase differences.

For example, carrying out the presented method or method steps recurrently the temporal phase difference between two moments, for example between consecutive moments, can be determined.

The method and systems presented here can be in particular useful and beneficial in any tasks and technical field where the evolution of the wavefront is of importance.

In ophthalmology, for example, the assessment of the temporal evolution of tear dynamics can be facilitated.

In space technology and astronomy, the evaluation of the evolution of any turbulent medium, for example the atmosphere, with any type of detector or camera already in use without the necessity of extra component, can be accomplished or facilitated.

In free space communications, the modulation of phase-signals and the demodulation phase-modulated signals can be facilitated.

In further industrial fields, for example, the monitoring of the temperature of any component by means of modelling the distortion of the air produced by different heat levels can be improved.

Also, when compared to known systems, the present method and system(s) can offer the advantage that the full resolution or full field of view of an image detector, e.g. a camera, can be used and exploited.

As previously mentioned, the present method and system(s) advantageously provides a robust, easy to calibrate and simplified optical design that can be based on a single image detector, e.g. a single camera, without requiring any movable component.

Furthermore, the herein presented systems are robust with respect to any changes in alignment of the optical system.

For example, a change in alignment of the system does not affect the measurement, since the measured wavefront can be realized by a subtraction of two images taken at the same optical plane, it can be self-calibrated.

Furthermore, in the herein presented method and system(s) all received intensity can be used in the measurements and no beam splitters or extra optical components are needed.

It is, for example, also not necessary to interlock the computational timing of different image detectors.

The optical plane in which the temporal phase differences or temporal wavefront changes can be calculated can be located at any place along the optical path of the optical system.

In other words, the optical plane in which the wavefront evolution or temporal wavefront changes is to be reconstructed does not need to coincide with any specific optical plane, e.g. aperture plane or pupil plane, of the optical system.

For completeness it is noted, that if need be, the presented method and systems may also be applied in two more optical planes, e.g. in two or more focal planes, for example, when using/deploying a plurality of image detectors at different optical planes.

Furthermore, at least one image from the at least two different images taken at different times can be derived from a combination of selected images from the series of images taken at different times, e.g. by computing an average or median of the selected images.

Additionally or alternatively at least one image from the at least two different images taken at different times can be computationally generated or calculated, i.e. said computationally generated or calculated image is not actually physically taken by an image detector.

For example, a generated or computationally calculated image may comprise a calculated pupil or a computational estimation of a light intensity or light intensity distribution or a computational estimation of a wavefront curvature.

Given a pair of two images taken at two different times or time moments, the image taken at the earlier or earliest time or time moment may be referred to as intra-time image and the other image as extra-time image. Stated differently, the intra-time image in a pair of images has an earlier time stamp then the extra-time image in said pair.

To solve the above-mentioned equation at least two images taken at different times are needed. These two images, of which one of them does not necessarily have to be physically captured by the system, can be obtained by means of several methods.

For example, both images can be taken at different moments, to t1 t2 . . . tn, being the first difference in phase calculated between moments t0 and t1, using one of them as intra-time image and the other one as extra-time image. In the next moment the process can be repeated with images t2 and t3 if the change of the phase between moments t1 and t2 can be considered negligible or is well characterized. Also it is possible to capture only one new image each time, tn, and calculate the difference in phase between tn and, for example, the nearest in time recorded image, tn−1.

It is also possible to select a particular image of interest as the initial moment image, t0, and to obtain the difference in phase with respect this reference image. In this case, the pairs of images for calculations would be: t0 and t1, t0 and t2 . . . t0 and tn. Additionally, if this reference image, t0, is calibrated in some way, for example by phase retrieval, indirect wavefront sensors or other methods, it would be possible to obtain not only the evolution among time of the wavefront but the absolute wavefront error in every moment. Additionally, a group of images, for example an average or median of a variety of images, can also be used as one or both of the intra-time and extra-time images. Furthermore, it is possible to assign a computationally generated or calculated image, inter alia a computational representation of the pupil, as the reference image, t0, so the temporal difference between any moment, tn, and the reference image, t0, will represent the wavefront error at tn.

An application of the technique described herein lies inter alia in improving the performance of any known wavefront sensor, no matter what technology said wavefront sensor is based on.

As a majority of wavefront sensors is based on collecting measurements of intensity in a certain plane along the optical axis onto an image detector, e.g. charge-coupled device (CCD) sensor or a complementary metal-oxide-semiconductor (CMOS) sensor, when a temporal variation between at least two images is considered, the herein described temporal approach of sampling and reconstruction of temporal wavefront changes analysing can be applied.

This advantageously allows obtaining redundant and complementary information of the wavefront, i.e. of the wavefront to be analyzed and/or to be reconstructed.

For example, in the case of a Shack-Hartmann wavefront sensor, if the total intensity behind each microlens in the necessary lenslet of such a sensor is integer and it is considered as an alternative data set, the result is a matrix of size equal to the number of microlenses with intensity measurements.

Therefore, it is equivalent to a curvature sensor with low resolution. In this way if, beside the traditional information of the Shack-Hartmann sensor (first derivative of the wavefront), temporal wavefront changes are measured as described here, information about the second derivative of the wavefront can be obtained. Hence, limitations of Shack-Hartmann sensors, such as truncated or double spots in the presence of high aberrations or strange aberration patterns can be solved using the approach described herein, thereby inter alia increasing sensitivity and dynamic range of the Shack-Hartmann wavefront sensor. Furthermore, the method(s) described herein may be applied to any type of wavefront sensor, e.g. indirect, pyramidal, curvature or interferometric wavefront sensors.

It is further noted that herein the propagation of wavefronts, i.e. electromagnetic wavefronts, or photons is assumed to follow the laws of geometrical optics, i.e. it is, for example, assumed that the direction of propagation is perpendicular to the wavefront. For completeness, it is noted that the wavefront can be defined by the set of points of a wave having the same phase, i.e. the wavefront or wavefront shape can be described by a phase map, e.g. a two-dimensional phase map.

Furthermore, it is assumed that the distribution function of the light intensity of a propagated wavefront can be represented by a probability density function (PDF) for the probability of photon arrival. It is further assumed, that the wavefront propagation conserves the flux, i.e. that the total area under the one-dimensional PDF curve remains constant.

As previously mentioned, the above exemplary described method steps can be carried out using any optical plane along the optical path of the optical system. In other words, the optical plane in which the images are captured does not need to coincide with any specific optical plane, e.g. aperture plane or pupil plane, of the optical system.

Furthermore, it is noted that the method described herein can be applied in focal or afocal optical systems.

Optionally, the above-mentioned step of measuring the distribution function of the light intensity in at least two different images taken at different times in at least one optical plane, e.g. the same optical plane, of the optical system, can be carried out recurrently.

Thereby at least one of the at least two different images taken at different times can remain the same during the possible recurrent step of measuring the distribution function of the light intensity.

It is further conceivable that at least one taken image can be calibrated, for example by means of a phase retrieval algorithm and/or with data from at least one further wavefront sensor, e.g. a Shack-Hartmann sensor, a pyramidal sensor, a shearing interferometry sensor or a curvature sensor.

The above-mentioned exemplary at least two different images taken at different times can be selected or derived from a series of images taken at different times, e.g. from a series of images taken at times t0, t1, t2 . . . tn, with n being a natural number.

Furthermore, for example, at least one image from said at least two different images taken at different times can be derived from a combination of selected images from the series of images taken at different times, e.g. by computing an average or median of the selected images.

Alternatively or in addition, at least one image from said at least two different images taken at different times can be computationally calculated, i.e. at least one image from said at least two different images taken at different times does not need to be an image that was physically taken by an image detector, e.g. a camera.

As previously indicated, steps of the method described above and herein may be carried out recurrently.

In particular, for example, the step of measuring the distribution function of the light intensity in at least two different images taken at different times in at least one optical plane, e.g. the same optical plane, of the optical system, can be carried out recurrently.

Thereby at least one of the at least two different images taken at different times can remain the same during a possible optional recurrent step of measuring the distribution function of the light intensity.

The possible recurrent carrying out of the above-mentioned exemplary steps can inter alia facilitate the monitoring and measurement of the temporal evolution of the wavefront.

As also previously mentioned, at least one taken image can be calibrated, for example, by means of a phase retrieval algorithm and/or with data from a wavefront sensor, e.g. with data from a further additional wavefront sensor.

This can advantageously allow an easy and robust calibration of the optical system.

The method(s) presented here may further comprise a step of calculating the changes to be made in a deformable mirror based on the measured distribution function of the light intensity in the at least two different images taken at different times, for compensating wavefront changes that occurred between the times at which said images were taken.

This can inter alia allow improving the performance of an Adaptive Optics (AO) system, in particular improving the speed with which necessary changes in the Adaptive Optics (AO) system, e.g. changes in a deformable mirror, can be computed, in particular for correcting wavefront distortions due to air/atmospheric turbulences.

An exemplary computer system that may comprise at least one processor unit, e.g. a graphical processor unit, GPU, or a central processing unit, CPU, can be configured to carry out a method for two-dimensional reconstruction of wavefronts according to one, some or all of the method steps described above and herein to carry out a reconstruction of temporal wavefront changes.

Furthermore, one or more computer readable storage media may have stored instructions that, when executed by one or more processors, can direct the one or more processors to perform one, some or all of the method steps described above and herein.

An exemplary optical system may comprise at least one image detector, e.g. a common two-dimensional digital camera, wherein the optical system can be configured to carry out a reconstruction of temporal wavefront changes according to one, some or all of the preceding method steps based on data from the at least one image detector.

Stated differently, the at least one image detector, e.g. a common two-dimensional digital camera, may act as wavefront sensor, in particular may act as an indirect wavefront sensor.

In other words, said at least one image detector or said exemplary optical system can be understood as being/forming an indirect wavefront sensor or curvature sensor.

Hence, a possible exemplary wavefront sensor or curvature sensor may comprise at least one image detector, e.g. a common two-dimensional digital camera, wherein the wavefront sensor or curvature sensor can be configured to carry out a reconstruction of temporal wavefront changes according to one, some or all of the preceding method steps based on data from the at least one image detector.

An/said exemplary optical system may further comprise a deformable mirror configured for real-time compensation of wavefront errors or temporal wavefront changes induced by an inhomogeneous medium, wherein said wavefront errors or temporal wavefront changes have, for example, been determined according to one of the preceding method steps based on data from the at least one image detector.

Said possible exemplary deformable mirror of said exemplary optical system may further be configured to induce deformations on wavefronts to generate a phase modulated signal for use in/enabling free-space optical communications.

Said exemplary optical system may further comprise at least one (additional) indirect wavefront sensor and/or may comprise at least one further direct wavefront sensor, e.g. a Shack-Hartmann sensor, a pyramidal sensor, a shearing interferometry sensor or a curvature sensor.

An exemplary method for reconstruction of temporal wavefront changes for use in an optical system, in particular for use in an Adaptive Optics (AO) system comprising at least one deformable mirror may comprise one, some, or all of the following steps.

a) measuring the distribution function of the light intensity, e.g. the two-dimensional distribution function of the light intensity, in at least two different images, e.g. in at least one pair of images, taken at different times, e.g. $t_0$ and $t_1$, wherein said images are taken in at least one optical plane, e.g. the same optical plane, of the optical system, and wherein the earliest time, e.g. $t_0$, may be referred to as initial time or initial moment, b) identifying or labeling or classifying at least one image as intra-time image and at least one image as extra-time image, wherein said identifying or labeling or classifying, for example, is carried out on the basis that the intra-time image is/was taken at a time before the extra-time image is/was taken, c) applying a wavefront phase retrieval algorithm to the intra-time and extra-time image(s) for reconstructing temporal wavefront changes or phase changes that occurred between the times, e.g. $t_0$ and $t_1$, at which said images were taken, d) calculating the changes to be done in the deformable mirror, for example, by means of an influence matrix inter alia based on the wavefront information obtained by the wavefront phase retrieval algorithm of the preceding step, e) measuring the distribution function of the light intensity in an image taken at a time $t_n$ posterior to the times, e.g. $t_0$ and $t_1$, at which the images in step a) were taken, and reconstructing the change of the wavefront according to steps b) to d), that occurred between the earliest time an image was taken, e.g. initial moment, $t_0$, and the currently considered time or time moment, e.g. $t_n$, posterior to the times, e.g. $t_0$ and $t_1$, at which the images in step a) were taken, wherein this step can be carried out iteratively and indefinitely for every posterior moment $t_{n+m}$, for any pairs of $t_0$ and $t_{n+m}$, with n, m being natural numbers, wherein m can be greater or equal 1.

f) calculating in, for example, a parallel process the optimal configuration of the deformable mirror which best or better corrects the phase of the initial moment, e.g. $t_0$, wherein this optimization process can make use of the data of phase retrieval algorithms and/or additional direct or indirect wavefront sensors and can employ global optimization algorithms, e.g. annealing or genetic algorithms, or brute-force search algorithms for identifying the optimal configuration of mirror, e.g. the optimal configuration for actuators of the mirror.

g) adding to the current state of the deformable mirror, at any moment $t_{n+m}$, the information collected in step f from the arbitrary called initial moment, $t_0$, in order to achieve a complete correction of the system.

As previously indicated the method steps described above can be carried out also using two or more optical plane, e.g. two or more focal planes. The at least one optical plane and/or the plurality of optical planes can be located at any position along the optical path of the/a optical system.

In other words, the optical plane in which the images are captured does not need to coincide with any specific optical plane, e.g. aperture plane or pupil plane, of the optical system. Furthermore, it is noted again that the method described herein also can be applied in focal or afocal optical systems.

As indicated above, two images taken at two different times are required in order to find the phase difference in a certain moment with respect another one and to carry out a reconstruction of temporal wavefront changes or temporal wavefront variations in an optical system.

For example, if images are taken at moments t0, t1, t2 ... tn, the pair of images can be, for example tn and tn−m, with n, m being a natural or integer number(s).

Also it is possible to select an image as t0 and to use pairs of image where t0 is always one of them, as for example t0 and t1, t0 and t2 ... t0 and tn. This selected t0 image can be an arbitrary one, for example the first captured one, a computationally generated one, or a convenient one selected by a variety of ways, for example as an average of several images or a selection of a near diffraction limited image by means of lucky-imaging techniques. Likewise, a combined group of images can also be used as the tn image.

For example, when using the information about the temporal variation of the wavefront in combination with a deformable mirror it is possible to select any desired image, for example t0, as a reference image.

One advantage of the option of using always the same image, t0, in one of the pair of images needed for the calculations to reconstruct the original wavefront or reconstruct the temporal wavefront changes, is that only one new image is to be taken in every (posterior) moment, tn.

Because this, possible errors in the process are not propagated among time as in the case of using pairs of consecutive image (for example, t0 and t1, t1 and t2 . . . t2 and tn) but are of the same magnitude in every considered moment, tn.

Furthermore, in order to correct for all the possible aberrations present in the optical system, if desired, it is only necessary to correct for the aberrations due to the selected initial moment t0.

This can be done by, for example, finding the aberrations in t0 by phase retrieval methods and adding the necessary correction to a/the deformable mirror of the above-described exemplary AO system, which is already correcting for temporal phase variations.

It is worth noting that, as, for example, the t0 image can be maintained indefinitely in a memory of the image detector, the time consumed in the calculation of the phase of the t0 image it is of less importance. This can make it possible to use algorithms that provide more precise wavefront phase reconstruction despite being more costly in terms of time and computational resources.

For example, if the object to be observed is an extended object of which the intensity distribution is already known (e.g. an extended, not point-like artificial laser guide star), it is, for example, enough to find the combination of the possible mirror actuators of the deformable mirror, which provides the most similar output to the known original image.

If, for example, the object is a punctual image, for example, a star or a laser beam, the task would be to find the combination of mirror actuators that provide the most punctual like image output.

This correction can be done by trivial procedures like, for example, brute force methods, or by more sophisticated procedures like, for example, dedicated algorithms or indirect wavefront sensors.

In order to further improve the techniques presented here, it is further possible, for example, to induce a series of intentionally defocused images in the process, by means of the deformable mirror, which would improve the performance of, for example, phase retrieval algorithms. As this intentional defocus induction is known and controlled, it can be subtracted again from the AO system in any desired moment in order to achieve a complete correction.

Also, in order to know the phase of this arbitrary called initial moment, $t_0$, it is possible to make the optical plane in which the images are taken alternately conjugate to further spatially separate intra-time and extra-time images, and to extract the phase information as if it were a common indirect wavefront curvature sensor with intra-focal and extra-focal images.

This can, for example, be achieved by means of a/the deformable mirror itself, and/or by moving physically the image detector or by any method that divides the incoming beam of light in at least two beams with different optical paths.

Additionally, said parallel phase retrieval process can run iteratively and indefinitely in order to give feedback to the exemplary AO system.

Compared to other AO techniques, which, inter alia, require intricate wavefront sensor designs involving a multitude of optical elements and that also require difficult and cumbersome integration techniques and wavefront parametrizations, e.g. using Zernike polynomials or Fourier transformations, the method(s) presented here can facilitate the wavefront correction.

The herein presented method requires little or no optics other than an imaging detector or imaging sensor, e.g. a camera, contrary to other wavefront sensors, such as, for example, Shack-Hartmann sensors or pyramidal sensors.

The herein presented method(s) can be implemented by software in, for example, any communications satellite already in orbit with any type of camera.

It is thereby conceivable, that the techniques describes herein can be used to provide additional channels for free-space communications.

For example, in a laser beam whose amplitude is being modulated to transmit information, a phase modulation can be included in the beam by means of, for example, a deformable mirror. This phase modulation can be recovered by software from the received images of the beam, thereby providing an additional channel of information. For instance, a deformable mirror with a frame rate of a few hundred Hz, e.g. 600 Hz, and considering, for example, a phase of a plurality of Zernike modes, e.g. 128 Zernike modes, with each mode representing a 1 or 0, can transmit in the simplest mode of operation, a significant amount of bits per second, e.g. for the mentioned values of a frame rate of 600 Hz and 128 Zernike modes a bit rate of 76800 additional bits per second can be obtained as an additional channel separate from the information transmitted by the amplitude modulations.

When compared to current systems and methods, the method(s) and systems(s) presented here provide more compact means, i.e. only require, without the need for additional optical elements like microlens arrays or prisms.

Also, it is noted that in the possible exemplary case that a/the correction of said initial t0 image is calculated with indirect wavefront methods (without having to divide the received intensity in two or more optical planes, e.g. focus planes), all the received intensity arrives to the optical plane of the possible image detector and can be used in the measurements, thereby significantly increasing the sensitivity of the method and system for reconstruction of temporal wavefront changes.

For example, in astronomy, this would allow dramatically fainter reference stars to be used for AO systems. Also, as all images can be taken in the same plane and mainly phase differences are measured, the system can be more robust to misalignment of the system, as it can be self-calibrated.

The above-mentioned methods and systems can be combined with common known wavefront sensors and AO systems to improve and extend the capabilities of the current AO systems.

For example, it is conceivable that in such a combined AO system the total phase error may be determined from a/the first image taken by a current standard wavefront sensor and the information on the temporal wavefront changes provided by the system/wavefront sensor/method described above, can be used to obtain complementary information on the wavefront at the subsequent (posterior) moments.

Thereby the dynamic range of the whole AO system can be improved, and wavefront reconstruction calculations can be speeded up, and problems such as the presence of truncated or double spots in Shack-Hartmann sensors can be avoided or alleviated.

BRIEF DESCRIPTION OF THE DRAWINGS

The following FIGURE illustrates exemplary.

DETAILED DESCRIPTION

Figure 1:
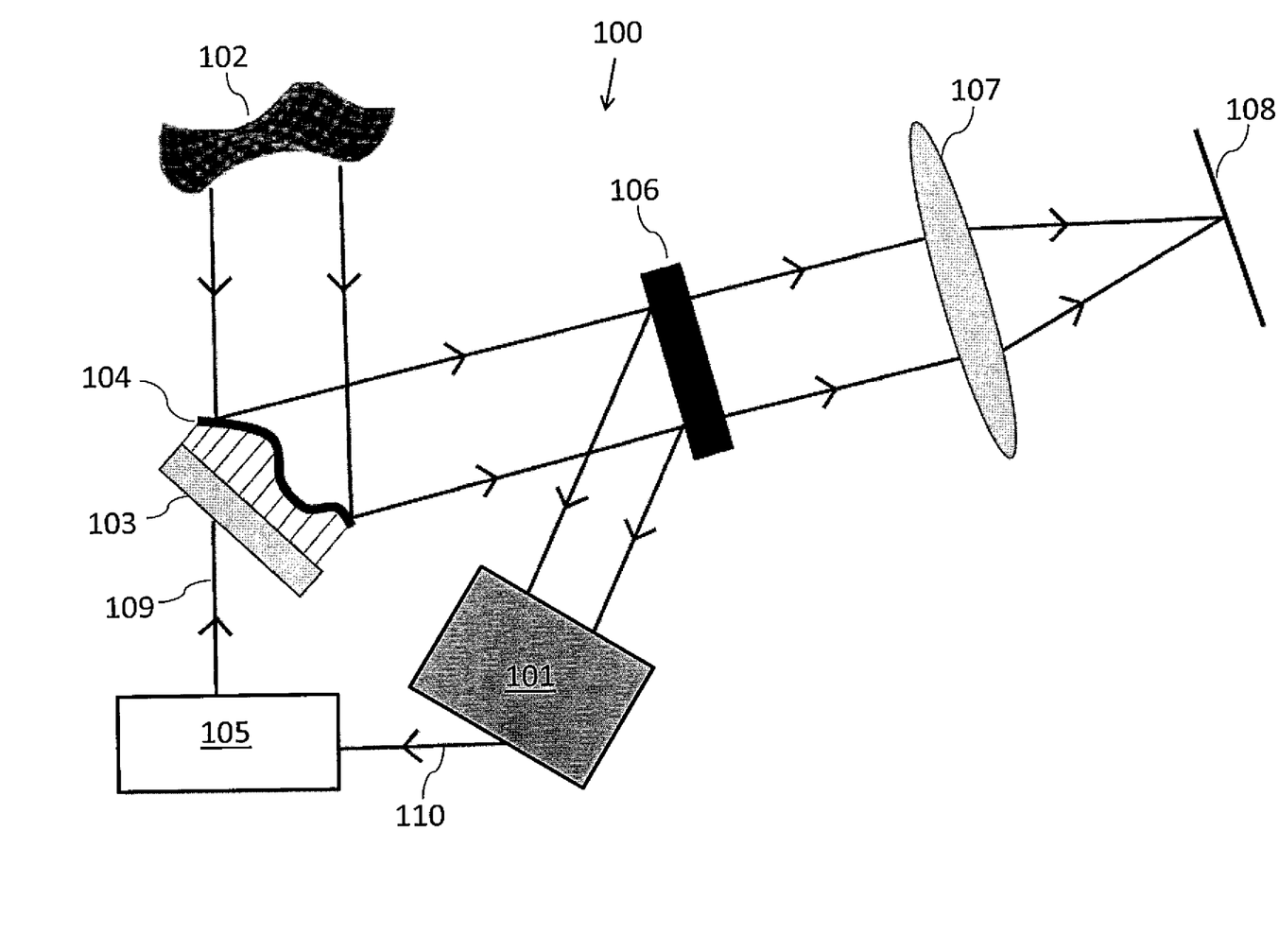
FIG. 1: Exemplary optical system, exemplary Adaptive Optics (AO) system.

The exemplary FIG. 1 schematically shows an exemplary Adaptive Optics (AO) system 100, e.g. an AO system of a telescope, in which the above described method(s) and components can be implemented.

Herein an exemplary wavefront 102 is shown which shape has been distorted or deformed with respect to its original shape, for example, due the wavefront passing an inhomogeneous medium, e.g. a turbulent atmosphere.

The lines with arrows in the FIGURE, unless otherwise noted, exemplary represent the direction of propagation of the wavefront 102.

The wavefront 102 is received by an exemplary deformable mirror 103, that exemplary induces a wavefront phase change to the wavefront 102 and the exemplary changed wavefront 104 passes an exemplary beam splitter 106, which directs a part of the wavefront 104 to the exemplary optical system or wavefront sensor 101 which can be configured to carry out any of the above mentioned method steps for reconstructing the temporal wavefront changes of the wavefront 102, 104.

In particular, the exemplary wavefront sensor 101 may comprise at least one image detector, e.g. a common two-dimensional digital camera or a CCD sensor or a CMOS sensor.

In particular, the exemplary wavefront sensor 101 may be configured for measuring the distribution function of the light intensity, e.g. the two-dimensional distribution function of the light intensity of the wavefront 102, 104, in at least two different images taken at different times, wherein said images are taken in at least one optical plane, e.g. the same optical plane, of the wavefront sensor 101.

Furthermore, the exemplary wavefront sensor 101 may be configured to calculate the changes to be made in the deformable mirror 103 based on the measured distribution function of the light intensity in the at least two different images taken at different times, for compensating wavefront changes in the wavefront 102, 104 that occurred between the times at which said images were taken.

The exemplary wavefront sensor 101 may further be configured to forward data 110 comprising the calculated necessary changes to be made in the deformable mirror 103 to reconstruct the original wavefront shape, e.g. to compensate the distortions of the wavefront due to the inhomogeneous medium the wavefront 102, 104 has passed through.

An exemplary optional control unit 105 may receive said data 110 from the wavefront sensor 101 and may be configured to send control signals 109 to the deformable mirror 103 to control and change the shape of the deformable mirror 103, e.g. by sending control and drive signals to actuators of the deformable mirror.

A feedback loop can be realized between the wavefront sensor 101 and the deformable mirror 103 to optimize the wavefront reconstruction.

The FIGURE further exemplary shows an optional optical element 107, e.g. a lens, that can focus the wavefront 104 that has been treated/modulated/changed/corrected by the deformable mirror 103 onto a detector plane 108, e.g. the detector plane of a telescope that captures the corrected/compensated image, i.e. the output of the exemplary AO system, 100.

Followed by one sheet comprising FIG. 1, wherein the reference numerals identify the following components.

100 Exemplary Adaptive Optics (AO) system
101 Exemplary optical system, exemplary wavefront sensor
102 Exemplary incoming wavefront, exemplary distorted wavefront
103 Exemplary deformable mirror
104 Exemplary modulation/change of incoming wavefront induced by the deformable mirror
105 Exemplary data processor/exemplary control unit to control deformable mirror, e.g. controlling the drive signals for actuators of the deformable mirror
106 Exemplary beam splitter
107 Exemplary optional optical element, e.g. lens
108 Exemplary detector plane, exemplary output image of AO system
109 Exemplary control signals to control the deformable mirror, e.g. to drive actuators of the deformable mirror
110 Exemplary control/data signals comprising the changes to be made to the deformable mirror based on the measurements of the wavefront sensor control

The invention claimed is:

1. A method for reconstruction of temporal wavefront changes in an optical system, the method comprising:
capturing at least two different images at different times using at least one image detector of the optical system, wherein the at least two different images are captured in a same plane, and wherein the at least one image detector receives wavefronts directed to the at least one image detector via the optical system, the wavefronts corresponding to the at least two different images;
measuring a distribution function of light intensity in the at least two different images captured at different times;
identifying at least one image of the at least two different images as an intra-time image and at least another image of the at least two different images as an extra-time image, wherein said identifying is carried out based on that the intra-time image is captured at a time before the extra-time image is captured;
applying a wavefront phase retrieval algorithm to the intra-time image and the extra-time image for reconstructing temporal wavefront changes that occurred between the times at which the intra-time image and the extra-time image were captured,
wherein the wavefront phase retrieval algorithm comprises a step of approximating said temporal wavefront changes that occurred between the times at which the intra-time image and the extra-time image were captured by $\approx I(x, y, z, t+\delta t) - I(x, y, z, t)$, and wherein $I(x, y, z, t+\delta t)$ and $I(x, y, z, t)$ are measured intensities in the extra-time image taken at time $t = t+\delta t$ and in the intra-time image taken at time $t$, wherein x, y, z are coordinates in an orthogonal coordinate system for the optical system, and wherein a Z-axis is aligned with an optical axis; and
sending one or more control signals, based on changes to be made in a deformable mirror of the optical system calculated based on the measured distribution function and the application of the wavefront phase retrieval algorithm, to the deformable mirror to control and change a shape of the deformable mirror.

2. The method of claim 1, further comprising selecting or deriving the at least two different images from a series of images captured at different times.

3. The method of claim 2, wherein at least one image from the at least two different images is derived from a combination of selected images from the series of images, wherein the at least one image from the at least two different images is computationally calculated.

4. The method of claim 1, wherein the step of measuring the distribution function of the light intensity in the at least two different images captured at the different times in the same plane is carried out recurrently.

5. The method of claim 4, wherein at least one of the at least two different images remains the same during the recurrent step of measuring the distribution function of the light intensity.

6. The method of claim 1, wherein the at least one image detector includes a wavefront sensor, the method further comprising calibrating at least one of the two different images by at least one of a phase retrieval algorithm and with data from the wavefront sensor.

7. The method of claim 1, further comprising calculating the changes to be made in the deformable mirror for compensating wavefront changes that occurred between the different times at which the at least two different images were captured.

8. The method of claim 3, wherein the at least one image from the at least two different images is derived from the combination of selected images by computing an average or median of the selected images.

9. An optical system for performing reconstruction of temporal wavefront changes, comprising:
at least one image detector;
a deformable mirror; and
at least one processor configured to:
capture at least two different images at different times using the at least one image detector of the optical system, wherein the at least two different images are captured in a same plane, and wherein the at least one image detector receives wavefronts directed to the at least one image detector via the optical system, the wavefronts corresponding to the at least two different images;
measure a distribution function of light intensity in the at least two different images captured at different times;
identify at least one image of the at least two different images as an intra-time image and at least another image of the at least two different images as an extra-time image, wherein said identification is carried out based on that the intra-time image is captured at a time before the extra-time image is captured;
apply a wavefront phase retrieval algorithm to the intra-time image and the extra-time image for reconstructing temporal wavefront changes that occurred between the times at which the intra-time image and the extra-time image were captured,
wherein the wavefront phase retrieval algorithm comprises a step of approximating said temporal wavefront changes that occurred between the times at which the intra-time image and the extra-time image were captured by $\approx I(x, y, z, t+\delta t) - I(x, y, z, t)$, and wherein $I(x, y, z, t+\delta t)$ and $I(x, y, z, t)$ are measured intensities in the extra-time image taken at time $t=t+\delta t$ and in the intra-time image taken at time $t$, wherein $x, y, z$ are coordinates in an orthogonal coordinate system for the optical system, and wherein a Z-axis is aligned with an optical axis; and
send one or more control signals, based on changes to be made in the deformable mirror of the optical system calculated based on the measured distribution function and the application of the wavefront phase retrieval algorithm, to the deformable mirror to control and change a shape of the deformable mirror.

10. The optical system of claim 9, wherein the deformable mirror is configured for real-time compensation of wavefront errors or temporal wavefront changes induced by an inhomogeneous medium,
wherein the processor is further configured to determine said wavefront errors or temporal wavefront changes based on data from the at least one image detector.

11. The optical system of claim 10, wherein the deformable mirror is further configured to induce deformations on wavefronts to generate a phase modulated signal for use in free-space optical communications.

12. The optical system of claim 9, wherein the at least one image detector includes at least one of: at least one indirect wavefront sensor and at least one direct wavefront sensor.

13. The optical system of claim 9, wherein the processor is further configured to select or derive at least one image from the at least two different images from a combination of selected images from a series of images taken at different times, wherein the at least one image from the at least two different images is computationally calculated.

14. The optical system of claim 10, wherein the processor is further configured to calculate the changes to be made in the deformable mirror for compensating wavefront changes that occurred between the different times at which the at least two different images were taken.

15. A non-transient computer readable storage medium including instructions stored therein that, when executed by one or more processors, causes the one or more processors to:
capture at least two different images at different times using an image detector of an optical system, wherein the at least two different images are captured in a same plane, and wherein the image detector receives wavefronts directed to the image detector via the optical system, the wavefronts corresponding to the at least two different images;
measure a distribution function of light intensity in at least two different images captured at different times;
identify at least one image of the at least two different images as an intra-time image and at least another image of the at least two different images as an extra-time image, wherein said identification is carried out based on that the intra-time image is captured at a time before the extra-time image is captured; and
apply a wavefront phase retrieval algorithm to the intra-time image and the extra-time image for reconstructing temporal wavefront changes that occurred between the times at which the intra-time image and the extra-time image were captured,
wherein the wavefront phase retrieval algorithm comprises a step of approximating said temporal wavefront changes that occurred between the times at which the intra-time image and the extra-time image were captured by $\approx I(x, y, z, t+\delta t) - I(x, y, z, t)$, and wherein I(x, y, z, t+δt) and I(x, y, z, t) are measured intensities in the extra-time image taken at time t=t+δt and in the intra-time image taken at time t, wherein x, y, z are coordinates in an orthogonal coordinate system for the optical system, and wherein a Z-axis is aligned with an optical axis; and send one or more control signals, based on changes to be made in a deformable mirror of the optical system calculated based on the measured distribution function and the application of the wavefront phase retrieval algorithm, to the deformable mirror to control and change a shape of the deformable mirror.

* * * * *